United States Patent
Medina Acosta et al.

(10) Patent No.: US 12,477,559 B2
(45) Date of Patent: Nov. 18, 2025

(54) DEVICES AND METHODS FOR SUPPORTING 16-QUADRATURE AMPLITUDE MODULATION (QAM) IN NARROW BAND TRANSMISSIONS

(71) Applicant: Telefonaktiebolaget LM Ericsson (PUBL), Stockholm (SE)

(72) Inventors: Gerardo Agni Medina Acosta, Märsta (SE); Kazuyoshi Uesaka, Kawasaki Kanagawa (JP); Jie Chen, Beijing (CN); Yuan Wang, Beijing (CN); Bela Rathonyi, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 588 days.

(21) Appl. No.: 17/907,882

(22) PCT Filed: Feb. 26, 2021

(86) PCT No.: PCT/EP2021/054948
§ 371 (c)(1),
(2) Date: Aug. 29, 2022

(87) PCT Pub. No.: WO2021/175743
PCT Pub. Date: Sep. 10, 2021

(65) Prior Publication Data
US 2023/0127333 A1    Apr. 27, 2023

(30) Foreign Application Priority Data
Mar. 2, 2020   (WO) ................ PCT/CN2020/077484

(51) Int. Cl.
*H04L 5/00* (2006.01)
*H04L 27/36* (2006.01)
(Continued)

(52) U.S. Cl.
CPC ........ *H04W 72/231* (2023.01); *H04L 5/0092* (2013.01); *H04L 27/362* (2013.01); *H04W 72/1273* (2013.01)

(58) Field of Classification Search
CPC .. H04W 72/231; H04L 5/0092; H04L 27/362; H04L 27/36; H04L 5/0057; H04L 5/0091
See application file for complete search history.

(56) References Cited

U.S. PATENT DOCUMENTS

| 12,063,110 B2* | 8/2024 | Shao ................. H04L 1/0026 |
| 2010/0022284 A1* | 1/2010 | Bergman ........... H04W 52/325 455/572 |

(Continued)

OTHER PUBLICATIONS

3GPP TS 36.213 v16.0.0; Technical Specification; 3rd Generation Partnership Project; Technical Specification Group Radio Access Network; Evolved Universal Terrestrial Radio Access (E-UTRA); Physical layer procedures (Release 16) [due to size, this document has been split into five parts]—Dec. 2019.

(Continued)

*Primary Examiner* — Lan-Huong Truong
(74) *Attorney, Agent, or Firm* — Baker Botts L.L.P.

(57) ABSTRACT

The present disclosure provides a method (100) in a network device. The method (100) includes: transmitting (110) Downlink Control Information, DCI, to a terminal device, the DCI containing information from which a TBS index is derivable. The BS index is usable to determine a TBS from a set of TBSs including TBSs usable with Quadrature Phase Shift Keying, QPSK, and TBSs usable with 16-Quadrature Amplitude Modulation, 16-QAM. When the DCI is for a Narrowband Physical Downlink Shared Channel, NPDSCH, the TBSs usable with 16-QAM are determinable by the terminal device based on a deployment mode.

21 Claims, 8 Drawing Sheets

(51) Int. Cl.
*H04W 72/1273* (2023.01)
*H04W 72/231* (2023.01)

(56) References Cited

U.S. PATENT DOCUMENTS

| | | | |
|---|---|---|---|
| 2015/0271802 A1* | 9/2015 | Kang | H04L 1/0003 370/329 |
| 2017/0135098 A1 | 5/2017 | Kang et al. | |
| 2018/0241527 A1* | 8/2018 | Chen | H04L 5/00 |
| 2021/0250968 A1* | 8/2021 | Sengupta | H04W 72/1268 |
| 2021/0329634 A1* | 10/2021 | Kim | H04W 72/0453 |

OTHER PUBLICATIONS

3GPP TS 36.212 v16.0.0; Technical Specification; 3rd Generation Partnership Project; Technical Specification Group Radio Access Network; Evolved Universal Terrestrial Radio Access (E-UTRA); Multiplexing and channel coding (Release 16)—Dec. 2019.
3GPP TSG RAN WG1 NB-Iot Ad-Hoc Meeting; Sophia Antipolis; Source: Ericsson; Title: NB-IOT—Remaining issues for NPDSCH design (R1-161825)—Mar. 22-24, 2016.
3GPP TSG RAN WG1 Meeting #97; Reno, Nevada; Source: MediaTek Inc.; Title: Support of 16QAM in NB-Iot (R1-1906654)—May 13-17, 2019.
3GPP TSG RAN Meeting #84; Newport Beach; Source: Ericsson; Title: Revised WID: Additional MTC enhancements for LTE (RP-191356 (revision of RP-190770))—Jun. 3-6, 2019.
PCT Notification of Transmittal of the International Search Report and the Written Opinion of the International Searching Authority, or the Declaration issued for International application No. PCT/EP2021/054948—Jun. 10, 2021.
3GPP TSG RAN Meeting #86; Sitges, Spain; Source: Huawei, HiSilicon; Title: New WID on Rel-17 enhancements for NB-IoT and LTE MTC (RP-193264)—Dec. 9-12, 2019.

* cited by examiner

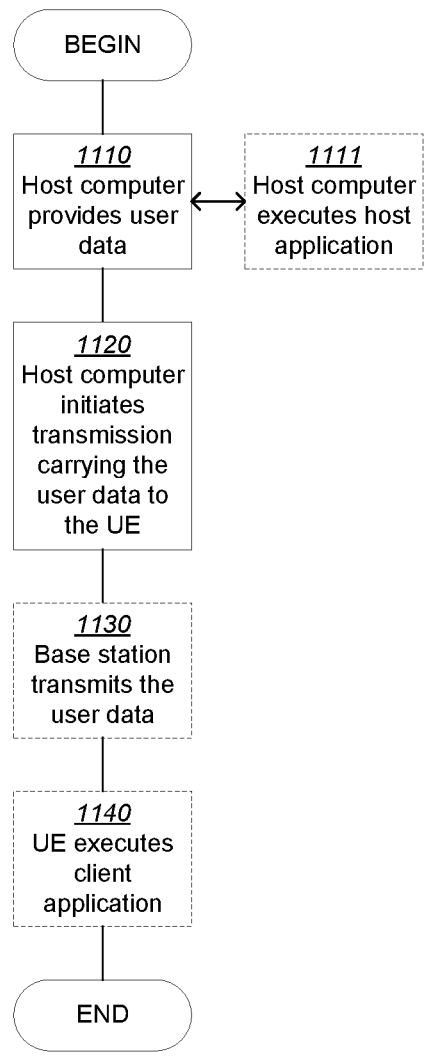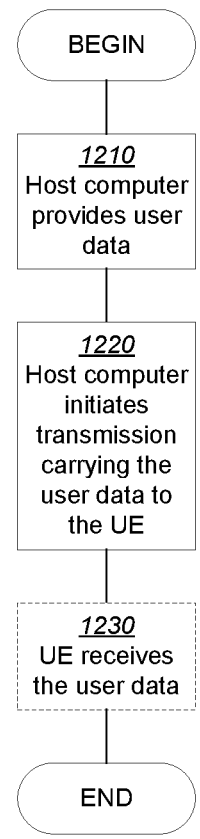
FIG. 11
FIG. 12

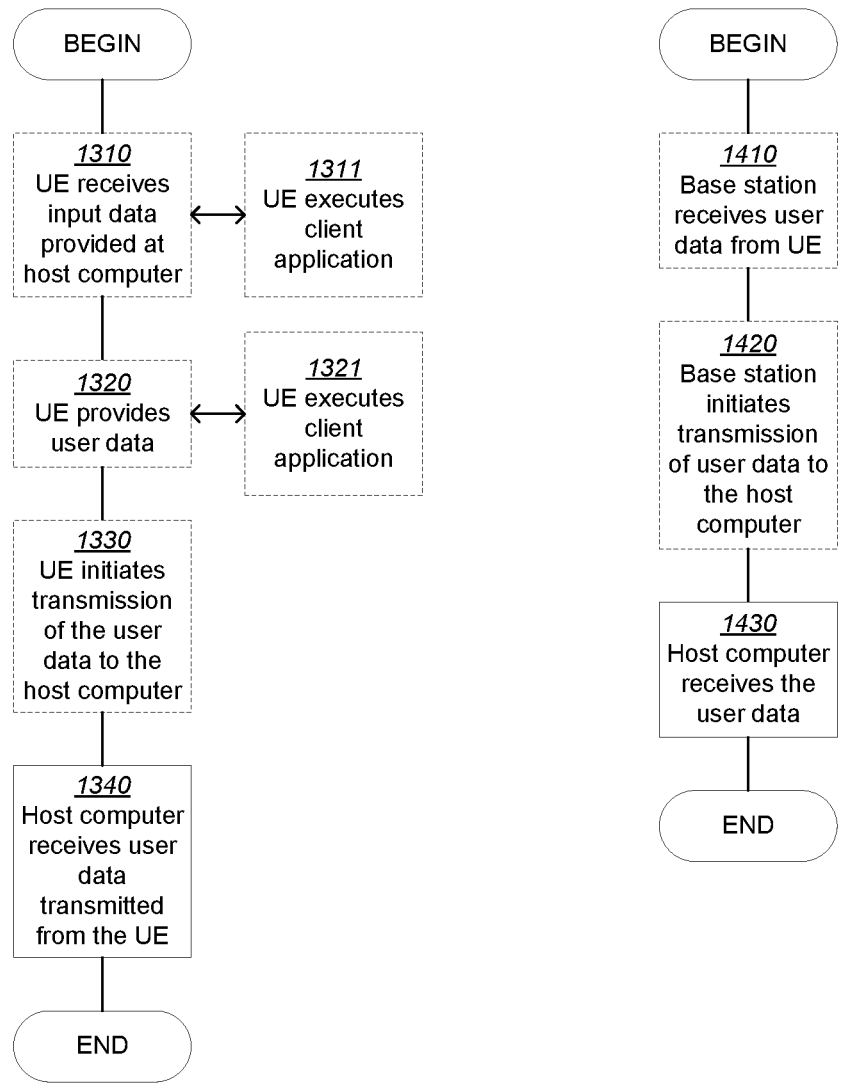

DEVICES AND METHODS FOR SUPPORTING 16-QUADRATURE AMPLITUDE MODULATION (QAM) IN NARROW BAND TRANSMISSIONS

PRIORITY

This nonprovisional application is a U.S. National Stage Filing under 35 U.S.C. § 371 of International Patent Application Serial No. PCT/EP2021/054948 filed Feb. 26, 2021 and entitled "DEVICES AND METHODS FOR SUPPORTING 16-QUADRATURE AMPLITUDE MODULATION (QAM) IN NARROW BAND TRANSMISSIONS" which claims priority to International Patent Application No. PCT/CN2020/077484 filed Mar. 2, 2020, both of which are hereby incorporated by reference in their entirety.

TECHNICAL FIELD

The present disclosure relates to communication technology, and more particularly, to a network device, a terminal device, and methods therein for supporting 16-Quadrature Amplitude Modulation (QAM) in Narrow Band (NB) transmissions, for example—Internet of Things (NB-IoT).

BACKGROUND

The 3$^{rd}$ Generation Partnership Project (3GPP) Technical Specification (TS) 36.213, V16.0.0, which is incorporated herein by reference in its entirety, specifies various aspects, such as Modulation and Coding Scheme (MCS), resource assignment, and Transport Block Size (TBS) allocation for NB-IoT.

According to Section 16.4 of TS 36.213, which specifies Narrowband Physical Downlink Shared Channel (NPDSCH) related procedures, a terminal device (or User Equipment (UE)) shall first read a 4-bit "modulation and coding scheme" field (I) in Downlink Control Information (DCI) and set $I_{TBS}=I_{MCS}$, and then read a 3-bit "resource assignment" field ($I_{SF}$) in the DCI and determine its TBS. The resource allocation information in DCI format N1, N2 (paging) for NPDSCH indicates to a scheduled UE:

- a number of subframes ($N_{SF}$) determined by the resource assignment field ($I_{SF}$) in the corresponding DCI according to Table 16.4.1.3-1 of TS 36.213, which is reproduced as Table 1 below, and
- a repetition number ($N_{Rep}$) determined by a repetition number field ($I_{Rep}$) in the corresponding DCI according to Table 16.4.1.3-2 of TS 36.213, which is reproduced as Table 2 below.

TABLE 1

Number of subframes ($N_{SF}$) for NPDSCH

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 2

Number of repetitions ($N_{Rep}$) for NPDSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

In relation with the above, a Category Narrow Band 2 (Cat-NB2) device can support in downlink a TBS up to 2536 bits. The TBS is given by the ($I_{TBS}$,$I_{SF}$) entry in Table 16.4.1.5.1-1 of TS 36.213, which is reproduced as Table 3 below.

TABLE 3

Transport block size (TBS) table for NPDSCH

| $I_{TBS}$ | $I_{SF}$ | | | | | | | |
| | 0 | 1 | 2 | 3 | 4 | 5 | 6 | 7 |
|---|---|---|---|---|---|---|---|---|
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

In uplink, Narrowband Physical Uplink Shared Channel (NPUSCH) Format 1 transmissions using a 15 KHz subcarrier spacing can be scheduled to use a single-tone ($\pi/2$-Binary Phase Shift Keying (BPSK), $\pi/4$-Quadrature Phase Shift Keying (QPSK)) or a multi-tone allocation (QPSK) consisting of either 3, 6, or 12 subcarriers. Moreover, in the time domain a given TBS can be mapped over one or more resource units. According to Section 16.5 of TS 36.213, which specifies Narrowband Physical Uplink Shared Channel (NPUSCH) related procedures, to determine a modulation order, redundancy version and TBS for NPUSCH, the following procedure should be followed. The UE shall: read a "modulation and coding scheme" field ($I_{MCS}$) in DCI or configured by higher layers for NPUSCH transmission using preconfigured uplink resource, read a "redundancy version" field ($rv_{DCI}$) in the DCI, read a "resource assignment" field ($I_{RU}$) in the DCI or configured by higher layers for NPUSCH transmission using preconfigured uplink resource, and compute the total number of allocated subcarriers ($N_{sc}^{RU}$), number of resource units ($N_{RU}$), and repetition number ($N_{Rep}$). The UE shall use modulation order, $Q_m=2$ if $N_{sc}^{RU}>1$. The UE shall use $I_{MCS}$ and Table 16.5.1.2-1 of TS 36.213 to determine the modulation order to use for NPUSCH if $N_{sc}^{RU}=1$. In relation with the above, a Cat-NB2 device can support in uplink a TBS up to 2536 bits. The UE shall use ($I_{TBS}$, $I_{RU}$) and Table 16.5.1.2-2 of TS 36.213 (which is reproduced below as Table 4) to determine the TBS to use for the NPUSCH. $I_{TBS}$ is given in Table 16.5.1.2-1 of TS 36.213 if $N_{sc}^{RU}=1$, $I_{TBS}=I_{MCS}$ otherwise.

TABLE 4

Transport block size (TBS) table for NPUSCH

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

The resource allocation information in uplink DCI format N0 for NPUSCH transmission or configured by higher layers for NPUSCH transmission using preconfigured uplink resource indicates to a scheduled UE:

- a set of contiguously allocated subcarriers ($n_{sc}$) of a resource unit determined by the Subcarrier indication field,
- a number of resource units ($N_{RU}$) determined by the resource assignment field according to Table 16.5.1.1-2 of TS 36.213, and
- a repetition number ($N_{Rep}$) determined by the repetition number field ($I_{Rep}$) according to Table 16.5.1.1-3 of TS 36.213 (which is reproduced below as Table 5).

TABLE 5

Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

SUMMARY

One of the objectives of the present application is to provide means for 16-QAM for unicast in uplink and downlink, including downlink power allocation for NPDSCH and downlink TBS. Ideally this would be provided without a new NB-IoT UE category. For downlink, an increase in maximum TBS of e.g. 2× the Rel-16 maximum, and soft buffer size by modifying at least existing Category NB2. For uplink, the maximum TBS should not be increased.

In the present disclosure, a network device, a terminal device, and methods therein are provided, capable of achieving at least part of the above objective.

According to a first aspect of the present disclosure, a method performed by a network device for indicating a TBS is provided. The method includes: transmitting DCI to a terminal device. The DCI contains information from which a TBS index is derivable. The TBS index is usable to determine a TBS from a set of TBSs including TBSs usable with QPSK and TBSs usable with 16-QAM. When the DCI is for a NPDSCH, the TBSs usable with 16-QAM are determinable by the terminal device based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs in a table previously defined for TBSs used with 16-QAM for Physical Downlink Shared Channel (PDSCH) in LTE, for example Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM may be used for NPUSCH Format 1 with a full Physical Resource Block (PRB) allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and Narrowband Physical Random Access Channel (NPRACH), or coexistence of the multi-tone allocation and an NPUSCH single tone allocation, within a RPB.

In an embodiment, the method may further include, in case of coexistence of NPUSCH and NPRACH, or coexistence of the multi-tone allocation and the NPUSCH single tone allocation, within the RPB: allocating a subcarrier within the PRB to another terminal device.

According to a second aspect of the present disclosure, a network device is provided. The network device includes a transceiver, a processor, and a memory. The memory stores instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a terminal device is provided. The method includes: receiving DCI from a network device; deriving a TBS index from information contained in the DCI; and determining, based on the TBS index, a TBS from a set of TBSs including TBSs usable with QPSK and TBSs usable with 16-QAM. When the DCI is for a NPDSCH, the TBSs usable with 16-QAM are determined based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs in a table previously defined for TBSs used with 16-QAM for Physical Downlink Shared Channel (PDSCH) in LTE, for example, Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM is used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

According to a fifth aspect of the present disclosure, a terminal device is provided. The terminal device includes a transceiver, a processor, and a memory. The memory stores instructions executable by the processor whereby the terminal device is operative to perform the method according to the fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the embodiments of the present disclosure, a set of TBSs, including TBSs usable with QPSK and TBSs usable with 16-QAM, is introduced. A network device can signal DCI to a terminal device, such that the terminal device can derive a TBS index from information contained in the DCI, and then determine a TBS from the set of TBSs based on the TBS index. The TBSs usable with 16-QAM can be determinable by the terminal device based on a deployment mode. In this way, 16-QAM can be supported in NPDSCH or NPUSCH, in such a manner that compatibility with the existing NPDSCH or NPUSCH related procedures can be maintained.

BRIEF DESCRIPTION OF THE DRAWINGS

The above and other objects, features and advantages will be more apparent from the following description of embodiments with reference to the figures, in which:

FIGS. 11 to 14 are flowcharts illustrating methods implemented in a communication system including a host computer, a base station and a user equipment.

DETAILED DESCRIPTION

Figure 1:
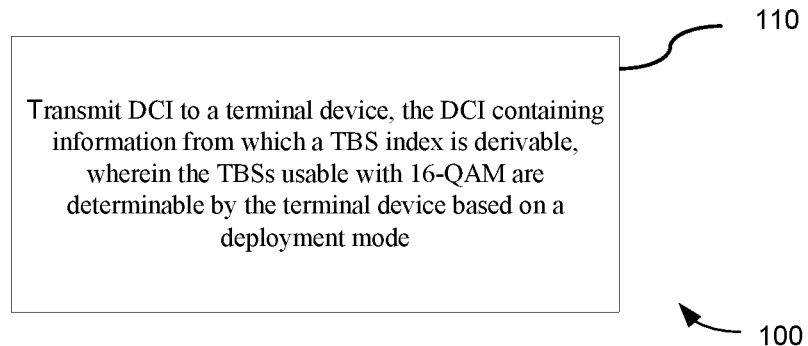
FIG. 1 is a flowchart illustrating a method in a network device according to an embodiment of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or a (next) generation NodeB (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), desktop computer, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for indicating a TBS according to an embodiment of the present disclosure. The method 100 can be performed at a network device, e.g., a gNB, for supporting 16-QAM in downlink/uplink for NB-IoT.

At block 110, DCI (e.g., DCI Format N1) is transmitted to a terminal device (e.g., a UE). The DCI contains information from which a TBS index ($I_{TBS}$) is derivable. For details of derivation of $I_{TBS}$ from the DCI, reference can be made to Section 16.4 of TS 36.213 and description thereof will be omitted here. $I_{TBS}$ is usable to determine a TBS from a set of TBSs including TBSs usable with QPSK and TBSs usable with 16-QAM. For example, $I_{TBS}$ can be used, along with $I_{SF}$ (or $N_{SF}$), to determine the TBS from a TBS table including TBSs used with QPSK and TBSs usable with 16-QAM.

Here, an example of the TBS table, which can be used e.g., when the terminal device operates in a stand-alone or guard-band deployment mode, is given as Table 6 below:

TABLE 6

TBS table for stand-alone or guard-band deployment mode

| | Number of NPDSCH Subframes ($N_{SF}$) | | | | | | | |
|---|---|---|---|---|---|---|---|---|
| $I_{TBS}$ | 1 | 2 | 3 | 4 | 5 | 6 | 8 | 10 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |

Table 6 can be obtained by adding two TBS indices 14 and 15 to Table 3 as described above. The TBSs usable with 16-QAM may be inherited from a set of TBSs in a table previously defined for TBSs used with 16-QAM for Physical Downlink Shared Channel (PDSCH) in LTE, e.g., the TBS associated with TBS indices 14 and 15 can be obtained from Table 7.1.7.2.1-1 of TS 36.213, which is produced as Table 7 below:

TABLE 7

Transport block size table for PDSCH in LTE

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |

TABLE 7-continued

Transport block size table for PDSCH in LTE

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

By utilizing the TBS indices 14 and 15 that are unused in Table 3, up to 16 new TBSs are made available for 16-QAM (note that a part or all of the $N_{SF}$ values 1, 2, 3, 4, 5, 6, 8, and 10 in Table 6 can be used for 16-QAM here). The maximum TBS in Table 6 is 3112 bits, which fulfills the objective of increasing in maximum TBS when compared with the Rel-16 maximum (2356 bits in Table 3).

In an example, the TBSs usable with 16-QAM may be dedicated for 16-QAM. For example, the TBSs dedicated for 16-QAM may be associated with TBS indices ranging from 14 to 15. In the above Table 6, the TBS indices 0-13, and accordingly their associated TBSs, may be used with QPSK only, while the TBS indices 1415, and accordingly their associated TBSs, may be used with 16-QAM only.

In another example, the TBSs usable with 16-QAM may include TBSs dedicated for 16-QAM and TBSs usable with both 16-QAM and QPSK. For example, the TBSs dedicated for 16-QAM may be associated with TBS indices ranging from 14 to 15, and the TBSs usable with both 16-QAM and QPSK may be associated with TBS indices ranging from 9 to 13. In the above Table 6, the TBS indices 0-8, and accordingly their associated TBSs, may be used with QPSK only; the TBS indices 1415, and accordingly their associated TBSs, may be used with 16-QAM only; and the TBS indices 9-13, and accordingly their associated TBSs, may be usable with both 16-QAM and QPSK.

The code rates for the TBSs associated with TBS indices 9-15 in Table 6, when used with 16-QAM for NPDSCH with two Narrowband Reference Signal (NRS) ports, are given in Table 8 below.

TABLE 8

Code rates for TBSs when used with 16-QAM

| NPDSCH | Number of NPDSCH Subframes ($N_{SF}$) | | | | | | | |
|---|---|---|---|---|---|---|---|---|
| TBS Index | 1 | 2 | 3 | 4 | 5 | 6 | 8 | 10 |
| 9 | 0.26 | 0.26 | 0.26 | 0.26 | 0.26 | 0.26 | 0.26 | 0.26 |
| 10 | 0.28 | 0.29 | 0.29 | 0.29 | 0.29 | 0.29 | 0.29 | 0.29 |
| 11 | 0.33 | 0.33 | 0.33 | 0.33 | 0.34 | 0.33 | 0.34 | 0.34 |
| 12 | 0.38 | 0.38 | 0.39 | 0.38 | 0.38 | 0.38 | 0.38 | 0.38 |
| 13 | 0.41 | 0.42 | 0.42 | 0.43 | 0.42 | 0.43 | 0.42 | 0.42 |
| 14 | 0.46 | 0.47 | 0.47 | 0.47 | 0.47 | 0.48 | 0.47 | 0.47 |
| 15 | 0.50 | 0.51 | 0.51 | 0.51 | 0.52 | 0.50 | 0.51 | 0.52 |

Unlike the stand-alone or guard-band deployment mode as described above, in an in-band deployment mode, the maximum $I_{TBS}$ is 10. In other words, the TBSs usable with 16-QAM may be associated with different ranges of TBS indices depending on whether the terminal device operates in a stand-alone, guard-band, or in-band deployment mode. An example of the TBS table, which can be used when the terminal device operates in the in-band deployment mode, is given as Table 9-1 below:

TABLE 9-1

TBS table for in-band deployment mode

| | Number of NPDSCH Subframes ($N_{SF}$) | | | | | | | |
|---|---|---|---|---|---|---|---|---|
| $I_{TBS}$ | 1 | 2 | 3 | 4 | 5 | 6 | 8 | 10 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |

Here, the TBSs usable with 16-QAM may include TBSs usable with both 16-QAM and QPSK. For example, the TBSs usable with both 16-QAM and QPSK may be associated with TBS indices ranging from 9 to 10 or from 6 to 10. In the above Table 9-1, the TBS indices 0-8, and accordingly their associated TBSs, may be used with QPSK only, and the TBS indices 9-10, and accordingly their associated TBSs, may be usable with both 16-QAM and QPSK. Alternatively, in the above Table 9-1, the TBS indices 0-5, and accordingly their associated TBSs, may be used with QPSK only, and the TBS indices 6-10, and accordingly their associated TBSs, may be usable with both 16-QAM and QPSK.

If the maximum $I_{TBS}$ that can be used in the in-band deployment mode is increased to 13, an example of the TBS table in this case is given as Table 9-2 below:

TABLE 9-2

TBS table for in-band deployment mode

| | Number of NPDSCH Subframes ($N_{SF}$) | | | | | | | |
|---|---|---|---|---|---|---|---|---|
| $I_{TBS}$ | 1 | 2 | 3 | 4 | 5 | 6 | 8 | 10 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

Here, the TBSs usable with 16-QAM may include TBSs usable with both 16-QAM and QPSK. For example, the TBSs usable with both 16-QAM and QPSK may be associated with TBS indices ranging from 9 to 13. In the above Table 9-2, the TBS indices 0-8, and accordingly their associated TBSs, may be used with QPSK only, and the TBS indices 9-13, and accordingly their associated TBSs, may be usable with both 16-QAM and QPSK.

The code rates for the TBSs in Tables 9-1 and 9-2, when used with 16-QAM for NPDSCH with two NRS ports and eutraControlRegionSize=3, are given in Table 10 below.

TABLE 10

Code rates for TBSs when used with 16-QAM

| NPDSCH | Number of NPDSCH Subframes ($N_{SF}$) | | | | | | | |
|---|---|---|---|---|---|---|---|---|
| TBS Index | 1 | 2 | 3 | 4 | 5 | 6 | 8 | 10 |
| 6 | 0.27 | 0.24 | 0.22 | 0.25 | 0.25 | 0.25 | 0.25 | 0.25 |
| 7 | 0.31 | 0.30 | 0.28 | 0.30 | 0.29 | 0.28 | 0.30 | 0.30 |
| 8 | 0.35 | 0.34 | 0.33 | 0.34 | 0.34 | 0.33 | 0.34 | 0.33 |
| 9 | 0.38 | 0.38 | 0.38 | 0.38 | 0.38 | 0.38 | 0.38 | 0.38 |
| 10 | 0.40 | 0.42 | 0.42 | 0.42 | 0.43 | 0.42 | 0.42 | 0.42 |
| 11 | 0.48 | 0.48 | 0.49 | 0.48 | 0.49 | 0.49 | 0.49 | 0.49 |
| 12 | 0.56 | 0.56 | 0.56 | 0.56 | 0.55 | 0.55 | 0.55 | 0.55 |
| 13 | 0.60 | 0.62 | 0.62 | 0.63 | 0.62 | 0.63 | 0.62 | 0.62 |

When the TBSs usable with 16-QAM include TBSs usable with both 16-QAM and QPSK, e.g., TBSs associated with TBS indices 9-13 in Table 6, TBS indices 9-10 or 6-10 in Table 9-1, or TBS indices 9-13 in Table 9-2, the DCI may further contain an indication of 16-QAM or QPSK. This indication, referred to as modulation order indication hereinafter, can be used to distinguish between 16-QAM and QPSK. For example, the modulation order indication may be a 1-bit indication or field which indicates a modulation order of 2 (meaning QPSK) when having a value of 0, or a modulation order of 4 (meaning 16-QAM) when having a value of 1. The modulation order indication may be included in a new field in the DCI, which increases the size of the DCI. Alternatively, the modulation order indication may be included in an existing field in the DCI, which does not increase the size of the DCI. For example, 1 bit in the existing field indicating a number of repetitions (or repetition level) for NPDSCH, referred to as NPDSCH repetition number field hereinafter, can be re-interpreted as the modulation order indication. Referring back to Table 2, the NPDSCH repetition number field contains 4 bits. Here, 3 bits, instead of all of the 4 bits, in this field can be used to indicate the number of repetitions for NPDSCH, resulting in a reduced set of repetition levels (i.e., 1, 2, 4, 8, 16, 32, 64, and 128), while 1 remaining bit can be used as the modulation order indication. In an example, the NPDSCH repetition number field can be switched between 3-bit and 4-bit configurations based on a repetition level threshold (e.g., 128). In this case, DCI containing a 4-bit NPDSCH repetition number field indicating a repetition level of 128 or lower can indicate that the NPDSCH repetition number field in the next DCI will have only 3 bits for indicating the repetition level and 1 bit as modulation order indication. Accordingly, DCI containing a 3-bit NPDSCH repetition number field indicating a repetition level of 128 and a modulation order indication of QPSK can indicate that the NPDSCH repetition number field in the next DCI will have 4 bits for indicating the repetition level and no modulation order indication. The 3-bit configuration of the NPDSCH repetition number field can be used e.g., in good radio conditions.

Alternatively or additionally to the above modulation order indication dynamically signaled via the DCI, the network device can transmit to the terminal device an indication of 16-QAM or QPSK semi-statically via RRC signaling. In this case, a new field for such indication can be added to an RRC signaling message.

In an example, when the DCI is for a NPUSCH, the 16-QAM may be used for NPUSCH Format 1 with a full PRB allocation or a multi-tone allocation consisting of 6 or 3 allocated subcarriers. The 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB. In case of coexistence of NPUSCH and NPRACH, or coexistence of the multi-tone allocation and the NPUSCH single tone allocation, within the RPB, a subcarrier within the PRB may be allocated to another terminal device.

Figure 2:
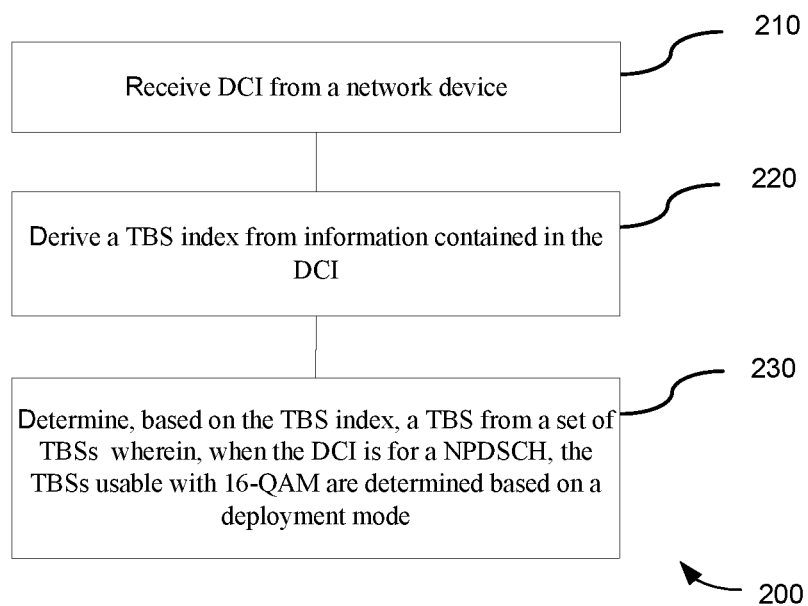
FIG. 2 is a flowchart illustrating a method in a terminal device according to an embodiment of the present disclosure.

FIG. 2 is a flowchart illustrating a method 200 according to an embodiment of the present disclosure. The method 200 corresponds to the above method 100 and can be performed at a terminal device, e.g., a UE, for supporting 16-QAM in downlink/uplink for NB-IoT.

At block 210, DCI is received from a network device (e.g., a gNB). For example, the DCI may correspond to the DCI transmitted by the network device in the block 110 of the method 100.

At block 220, a TBS index ($I_{TBS}$) is derived from information contained in the DCI. For details of derivation of $I_{TBS}$ from the DCI, reference can be made to Section 16.4 of TS 36.213 and description thereof will be omitted here.

At block 230, a TBS to be used for NPDSCH, for example, is determined, based on the TBS index, from a set of TBSs including TBSs usable with QPSK and TBSs usable with 16-QAM. For example, the TBS can be determined from a TBS table including TBSs used with QPSK and TBSs usable with 16-QAM, based on $I_{TBS}$ and $I_{SF}$ (or $N_{SF}$).

In an example, e.g., when the terminal device operates in a stand-alone or guard-band deployment mode, the TBSs usable with 16-QAM may be dedicated for 16-QAM. Referring to the above Table 6 for example, the TBSs dedicated for 16-QAM may be associated with TBS indices ranging from 14 to 15. Therefore, when the DCI is for a NPDSCH, the TBSs usable with 16-QAM are determinable by the terminal device based on a deployment mode. Accordingly, the terminal device can determine a modulation scheme for NPDSCH to be 16-QAM when the TBS determined in the block 230 is dedicated for 16-QAM.

In another example, e.g., when the terminal device operates in a stand-alone or guard-band deployment mode, the TBSs usable with 16-QAM may include TBSs dedicated for 16-QAM and TBSs usable with both 16-QAM and QPSK. Referring to the above Table 6 for example, the TBSs dedicated for 16-QAM may be associated with TBS indices ranging from 14 to 15, and the TBSs usable with both 16-QAM and QPSK may be associated with TBS indices ranging from 9 to 13.

In yet another example, e.g., when the terminal device operates in an in-band deployment mode, the TBSs usable with 16-QAM may include TBSs usable with both 16-QAM and QPSK. Referring to the above Table 9-1 and Table 9-2 for example, the TBSs usable with both 16-QAM and QPSK may be associated with TBS indices ranging from 9 to 10, from 6 to 10, or from 9 to 13.

When the TBSs usable with 16-QAM include TBSs usable with both 16-QAM and QPSK, the DCI may further contain an indication of 16-QAM or QPSK. The indication may be included in a new field or an existing field (e.g., NPDSCH repetition number field) in the DCI. As described above in connection with the method 100, the indication can be a 1-bit modulation order indication and the NPDSCH repetition number field can be switched between 3-bit and 4-bit configurations based on a repetition level threshold. Alternatively or additionally, the terminal device can receive from the network device an indication of 16-QAM or QPSK via RRC signaling (e.g., in a new field in an RRC message).

In either case, the terminal device can determine a modulation scheme for NPDSCH based on the indication of 16-QAM or QPSK.

In an example, when the DCI is for a NPUSCH, the 16-QAM may be used for NPUSCH Format 1 with a full PRB allocation or a multi-tone allocation consisting of 6 or 3 allocated subcarriers. The 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

Figure 3:
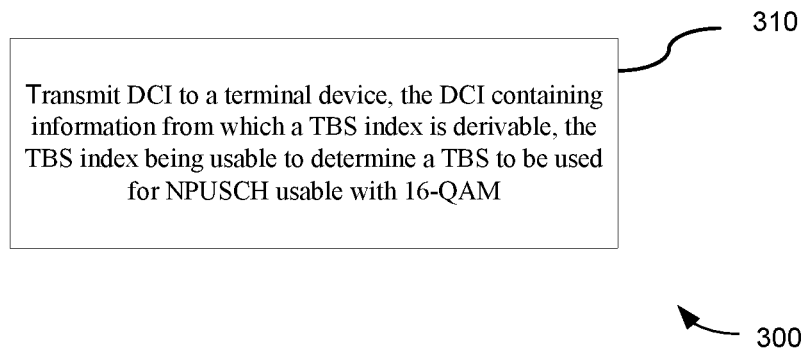
FIG. 3 is a flowchart illustrating a method in a network device according to another embodiment of the present disclosure.

FIG. 3 is a flowchart illustrating a method 300 according to an embodiment of the present disclosure. The method 300 can be performed at a network device, e.g., a gNB, for supporting 16-QAM in uplink for NB-IoT.

At block 310, DCI (e.g., DCI Format N1) is transmitted to a terminal device (e.g., a UE). The DCI contains information from which a TBS index ($I_{TBS}$) is derivable. For details of derivation of $I_{TBS}$ from the DCI, reference can be made to Section 16.5 of TS 36.213 and description thereof will be omitted here. $I_{TBS}$ is usable to determine a TBS to be used for NPUSCH from a set of TBSs including TBSs used with QPSK and TBSs usable with 16-QAM. For example, $I_{TBS}$ can be used, along with $I_{RU}$, to determine the TBS from a TBS table including TBSs used with QPSK and TBSs usable with 16-QAM.

In an example, the above Table 4 can be reused as the TBS table here, so as to fulfill the objective that "for uplink, the maximum TBS is not increased". The TBSs usable with 16-QAM may be usable with both 16-QAM and QPSK. In particular, the TBSs usable with 16-QAM may be associated with TBS indices ranging from 10 to 13. In the above Table 4 for example, the TBS indices 0-9, and accordingly their associated TBSs, may be used with QPSK only, while the TBS indices 1013, and accordingly their associated TBSs, may be usable with both 16-QAM and QPSK.

In an example, the DCI may further contain an indication of 16-QAM or QPSK. This indication, referred to as modulation order indication hereinafter, can be used to distinguish between 16-QAM and QPSK. For example, the modulation order indication may be a 1-bit indication or field which indicates a modulation order of 2 (meaning QPSK) when having a value of 0, or a modulation order of 4 (meaning 16-QAM) when having a value of 1. The modulation order indication may be included in a new field in the DCI, which increases the size of the DCI. Alternatively, the modulation order indication may be included in an existing field in the DCI, which does not increase the size of the DCI. For example, 1 bit in the existing field indicating a number of repetitions (or repetition level) for NPUSCH, referred to as NPUSCH repetition number field hereinafter, can be re-interpreted as the modulation order indication. Referring back to Table 5, the NPUSCH repetition number field contains 3 bits. Here, 2 bits, instead of all of the 3 bits, in this field can be used to indicate the number of repetitions for NPUSCH, resulting in a reduced set of repetition levels (i.e., 1, 2, 4, and 8), while 1 remaining bit can be used as the modulation order indication. In an example, the NPUSCH repetition number field can be switched between 2-bit and 3-bit configurations based on a repetition level threshold (e.g., 8). In this case, DCI containing a 3-bit NPUSCH repetition number field indicating a repetition level of 8 or lower can indicate that the NPUSCH repetition number field in the next DCI will have only 2 bits for indicating the repetition level and 1 bit as modulation order indication. Accordingly, DCI containing a 2-bit NPUSCH repetition number field indicating a repetition level of 8 and a modulation order indication of QPSK can indicate that the NPUSCH repetition number field in the next DCI will have 3 bits for indicating the repetition level and no modulation order indication. The 2-bit configuration of the NPUSCH repetition number field can be used e.g., in good radio conditions.

Alternatively or additionally to the above modulation order indication dynamically signaled via the DCI, the network device can transmit to the terminal device an indication of 16-QAM or QPSK semi-statically via RRC signaling. In this case, a new field for such indication can be added to an RRC signaling message.

In order to determine in which scenarios the 16-QAM can be used, one aspect to consider is that the larger the modulation order is, the higher the Signal to Noise Ratio (SNR) is required to be. Although resource allocations smaller than 12 subcarriers are mainly targeted for low SNRs (especially single-tone allocations), still there are scenarios (e.g., when NPRACH and NPUSCH allocation coexist within a PRB) where multi-tone allocations could benefit from higher order modulations (and associated TBSs).

In an example, the 16-QAM may be used for NPUSCH Format 1 with a full PRB allocation or a multi-tone allocation consisting of 6 or 3 allocated subcarriers.

In an example, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

In an example, in case of coexistence of NPUSCH and NPRACH, or coexistence of the multi-tone allocation and the NPUSCH single tone allocation, within the RPB, the network device can allocate a subcarrier (e.g., a subcarrier unused by the terminal device) within the PRB to another terminal device, e.g., for use with another modulation scheme such as BPSK, π/2-BPSK, or QPSK.

Figure 4:
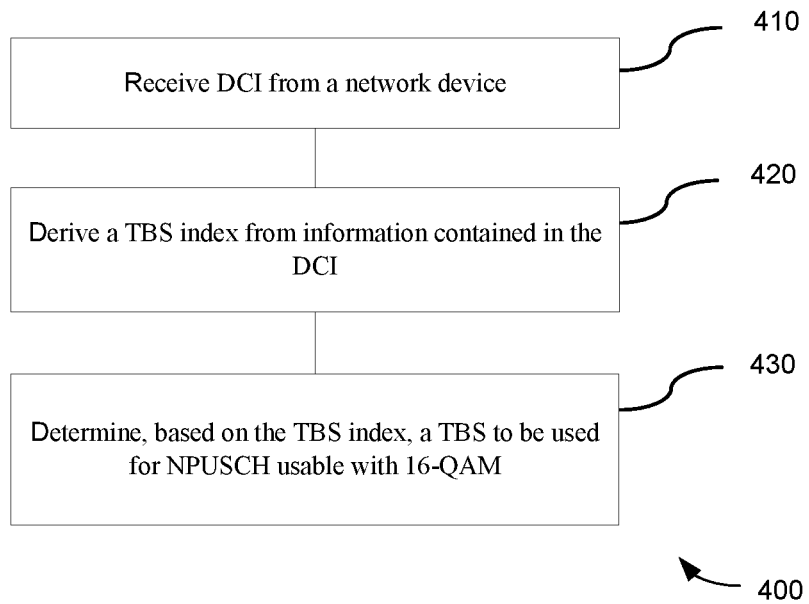
FIG. 4 is a flowchart illustrating a method in a terminal device according to another embodiment of the present disclosure.

FIG. 4 is a flowchart illustrating a method 400 according to an embodiment of the present disclosure. The method 400 corresponds to the above method 300 and can be performed at a terminal device, e.g., a UE, for supporting 16-QAM in uplink for NB-IoT.

At block 410, DCI is received from a network device (e.g., a gNB). For example, the DCI may correspond to the DCI transmitted by the network device in the block 110 of the method 100.

At block 420, a TBS index ($I_{TBS}$) is derived from information contained in the DCI. For details of derivation of $I_{TBS}$ from the DCI, reference can be made to Section 16.5 of TS 36.213 and description thereof will be omitted here.

At block 430, a TBS to be used for NPUSCH is determined, based on the TBS index, from a set of TBSs including TBSs used with QPSK and TBSs usable with 16-QAM. For example, the TBS can be determined from a TBS table including TBSs used with QPSK and TBSs usable with 16-QAM, based on $I_{TBS}$ and $I_{RU}$.

In an example, the TBSs usable with 16-QAM may be usable with both 16-QAM and QPSK. Referring to the above Table 4 for example, the TBSs usable with 16-QAM may be associated with TBS indices ranging from 10 to 13.

In an example, the DCI may further contain an indication of 16-QAM or QPSK. The indication may be included in a new field or an existing field (e.g., NPUSCH repetition number field) in the DCI. As described above in connection with the method 300, the indication can be a 1-bit modulation order indication and the NPUSCH repetition number field can be switched between 2-bit and 3-bit configurations based on a repetition level threshold. Alternatively or additionally, the terminal device can receive from the network device an indication of 16-QAM or QPSK via RRC signaling (e.g., in a new field in an RRC message). In either case, the terminal device can determine a modulation scheme for NPDSCH based on the indication of 16-QAM or QPSK.

In an example, the 16-QAM may be used for NPUSCH Format 1 with a full PRB allocation or a multi-tone allocation consisting of 6 or 3 allocated subcarriers.

In an example, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

Figure 5:
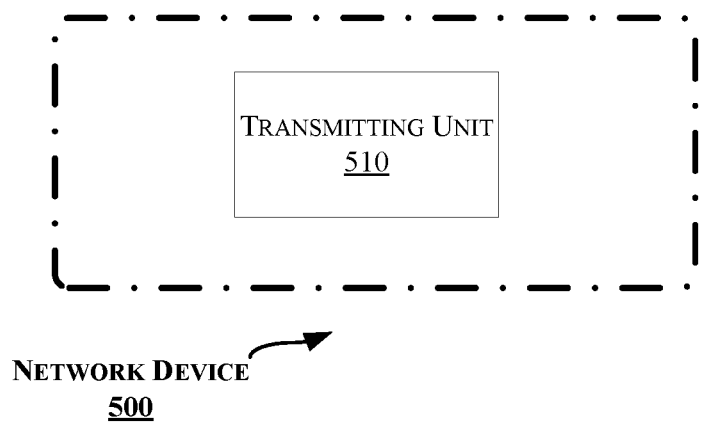
FIG. 5 is a block diagram of a network device according to an embodiment of the present disclosure.

Correspondingly to the method 100 or 300 as described above, a network device is provided. FIG. 5 is a block diagram of a network device 500 according to an embodiment of the present disclosure.

The network device 500 can be operative to perform the method 100 as described above in connection with FIG. 1. As shown in FIG. 5, the network device 500 includes a transmitting unit 510 configured to transmit DCI to a terminal device, the DCI containing information from which a TBS index is derivable. The TBS index is usable to determine a TBS from a set of TBSs including TBSs used with QPSK and TBSs usable with 16-QAM. When the DCI is for a Narrowband Physical Downlink Shared Channel, NPDSCH, the TBSs usable with 16-QAM are determinable by the terminal device based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs previously defined for TBSs used with 16-QAM for Physical Downlink Shared Channel (PDSCH) in LTE, for example Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM may be used for NPUSCH Format 1 with a full Physical Resource Block (PRB) allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

In an embodiment, the network device 500 may further include an allocating unit configured to, in case of coexistence of NPUSCH and NPRACH, or coexistence of the multi-tone allocation and the NPUSCH single tone allocation, within the RPB: allocate a subcarrier within the PRB to another terminal device.

Alternatively, the network device 500 can be operative to perform the method 300 as described above in connection with FIG. 3. As shown in FIG. 5, the network device 500 includes a transmitting unit 510 configured to transmit DCI to a terminal device, the DCI containing information from which a Transport Block Size, TBS, index is derivable. The TBS index is usable to determine a TBS to be used for NPUSCH from a set of TBSs including TBSs used with QPSK and TBSs usable with 16-QAM.

In an embodiment, the TBSs usable with 16-QAM may be usable with both 16-QAM and QPSK.

In an embodiment, the TBSs usable with 16-QAM may be associated with TBS indices ranging from 10 to 13.

In an embodiment, the DCI may further contain an indication of 16-QAM or QPSK.

In an embodiment, the indication may be included in a new field or an existing field in the DCI.

In an embodiment, the existing field may be a field indicating a number of repetitions for NPUSCH.

In an embodiment, the DCI containing the indication of QPSK and the field indicating a number of repetitions that is equal to a threshold may indicate that no indication of 16-QAM or QPSK is included in the field in next DCI.

In an embodiment, the transmitting unit 510 can be further configured to transmit to the terminal device an indication of 16-QAM or QPSK via RRC signaling.

In an embodiment, the 16-QAM may be used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and Narrowband Physical Random Access Channel (NPRACH), or coexistence of the multi-tone allocation and an NPUSCH single tone allocation, within a RPB.

In an embodiment, the network device 500 may further include an allocating unit configured to, in case of coexistence of NPUSCH and NPRACH, or coexistence of the multi-tone allocation and the NPUSCH single tone allocation, within the RPB: allocate a subcarrier within the PRB to another terminal device.

The transmitting unit 510 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 1 or 3.

Figure 6:
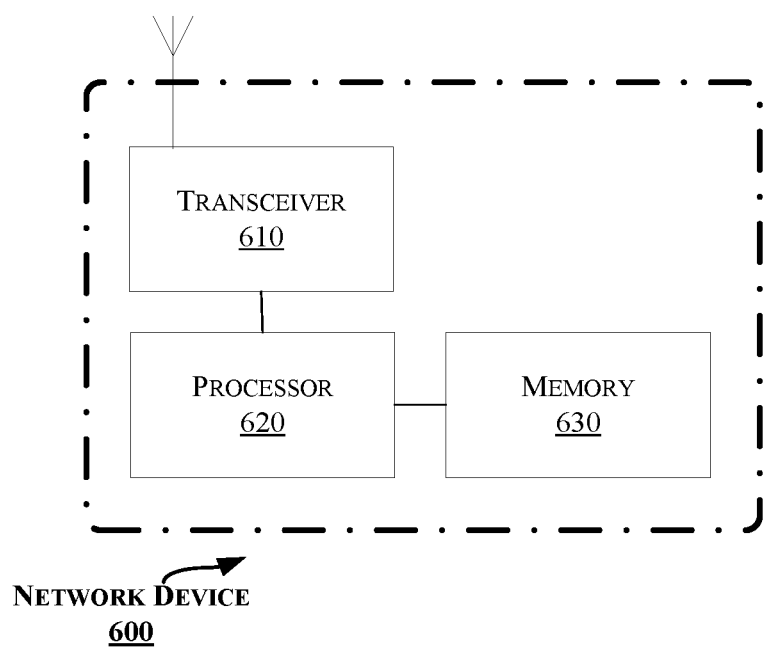
FIG. 6 is a block diagram of a network device according to another embodiment of the present disclosure.

FIG. 6 is a block diagram of a network device 600 according to another embodiment of the present disclosure.

The network device 600 includes a transceiver 610, a processor 620 and a memory 630. The memory 630 contains instructions executable by the processor 620 whereby the network device 600 is operative to perform the actions, e.g., of the procedure described earlier in conjunction with FIG. 1. Particularly, the memory 630 contains instructions executable by the processor 620 whereby the network device 600 is operative to: transmit DCI to a terminal device, the DCI containing information from which a TBS index is derivable. The TBS index is usable to determine a TBS from a set of TBSs including TBSs used with QPSK and TBSs usable with 16-QAM. When the DCI is for a NPDSCH, the TBSs usable with 16-QAM are determinable by the terminal device based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs previously defined for TBSs used with 16-QAM for Physical Downlink Shared Channel (PDSCH) in LTE, for example in Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM may be used for NPUSCH Format 1 with a full Physical Resource Block (PRB) allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and Narrowband Physical Random Access Channel (NPRACH), or coexistence of the multi-tone allocation and an NPUSCH single tone allocation, within a RPB.

In an embodiment, the memory 630 may further contain instructions executable by the processor 620 whereby the network device 600 is operative to: in case of coexistence of NPUSCH and NPRACH, or coexistence of the multi-tone allocation and the NPUSCH single tone allocation, within the RPB: allocate a subcarrier within the PRB to another terminal device.

Alternatively, the memory 630 contains instructions executable by the processor 620 whereby the network device 600 is operative to perform the actions, e.g., of the procedure described earlier in conjunction with FIG. 3. Particularly, the memory 630 contains instructions executable by the processor 620 whereby the network device 600 is operative to: transmit DCI to a terminal device, the DCI containing information from which a Transport Block Size, TBS, index is derivable. The TBS index is usable to determine a TBS to be used for NPUSCH from a set of TBSs including TBSs used with QPSK and TBSs usable with 16-QAM.

In an embodiment, the TBSs usable with 16-QAM may be usable with both 16-QAM and QPSK.

In an embodiment, the TBSs usable with 16-QAM may be associated with TBS indices ranging from 10 to 13.

In an embodiment, the DCI may further contain an indication of 16-QAM or QPSK.

In an embodiment, the indication may be included in a new field or an existing field in the DCI.

In an embodiment, the existing field may be a field indicating a number of repetitions for NPUSCH.

In an embodiment, the DCI containing the indication of QPSK and the field indicating a number of repetitions that is equal to a threshold may indicate that no indication of 16-QAM or QPSK is included in the field in next DCI.

In an embodiment, the memory 630 may further contain instructions executable by the processor 620 whereby the network device 600 is operative to: transmit to the terminal device an indication of 16-QAM or QPSK via RRC signaling.

In an embodiment, the 16-QAM may be used for NPUSCH Format 1 with a full Physical Resource Block (PRB) allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and Narrowband Physical Random Access Channel (NPRACH), or coexistence of the multi-tone allocation and an NPUSCH single tone allocation, within a RPB.

In an embodiment, the memory 630 may further contain instructions executable by the processor 620 whereby the network device 600 is operative to: in case of coexistence of NPUSCH and NPRACH, or coexistence of the multi-tone allocation and the NPUSCH single tone allocation, within the RPB: allocate a subcarrier within the PRB to another terminal device.

Figure 7:
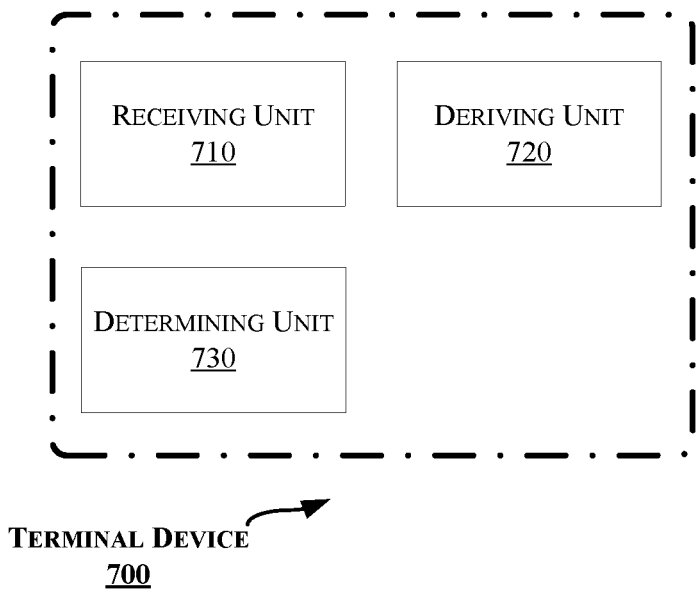
FIG. 7 is a block diagram of a terminal device according to an embodiment of the present disclosure.

Correspondingly to the method 200 or 400 as described above, a terminal device is provided. FIG. 7 is a block diagram of a terminal device 700 according to an embodiment of the present disclosure.

The terminal device 700 can be operative to perform the method 300 as described above in connection with FIG. 2. As shown in FIG. 7, the terminal device 700 includes a receiving unit 710 configured to receive DCI from a network device. The terminal device 700 further includes a deriving unit 720 configured to derive a TBS index from information contained in the DCI. The terminal device 700 further includes a determining unit 730 configured to determine, based on the TBS index, a TBS from a set of TBSs including TBSs usable with QPSK and TBSs usable with 16-QAM. When the DCI is for a NPDSCH, the TBSs usable with 16-QAM are determined based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs previously defined for TBSs used with 16-QAM for Physical Downlink Shared Channel (PDSCH) in LTE, for example in Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM is used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

Alternatively, the terminal device 700 can be operative to perform the method 300 as described above in connection with FIG. 4. As shown in FIG. 7, the terminal device 700 includes a receiving unit 710 configured to receive DCI from a network device. The terminal device 700 further includes a deriving unit 720 configured to derive a TBS index from information contained in the DCI. The terminal device 700 further includes a determining unit 730 configured to determine, based on the TBS index, a TBS to be used for NPUSCH from a set of TBSs including TBSs used with QPSK and TBSs usable with 16-QAM.

In an embodiment, the TBSs usable with 16-QAM may be usable with both 16-QAM and QPSK.

In an embodiment, the TBSs usable with 16-QAM may be associated with TBS indices ranging from 10 to 13.

In an embodiment, the DCI may further contain an indication of 16-QAM or QPSK.

In an embodiment, the indication may be included in a new field or an existing field in the DCI.

In an embodiment, the existing field may be a field indicating a number of repetitions for NPUSCH.

In an embodiment, the DCI containing the indication of QPSK and the field indicating a number of repetitions that is equal to a threshold may indicate that no indication of 16-QAM or QPSK is included in the field in next DCI.

In an embodiment, the receiving unit 710 can be further configured to receive from the network device an indication of 16-QAM or QPSK via RRC signaling.

In an embodiment, the determining unit 730 can be further configured to determine a modulation scheme for NPUSCH based on the indication of 16-QAM or QPSK.

In an embodiment, the 16-QAM may be used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

The receiving unit 710, the deriving unit 720, and the determining unit 730 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2 or 4.

Figure 8:
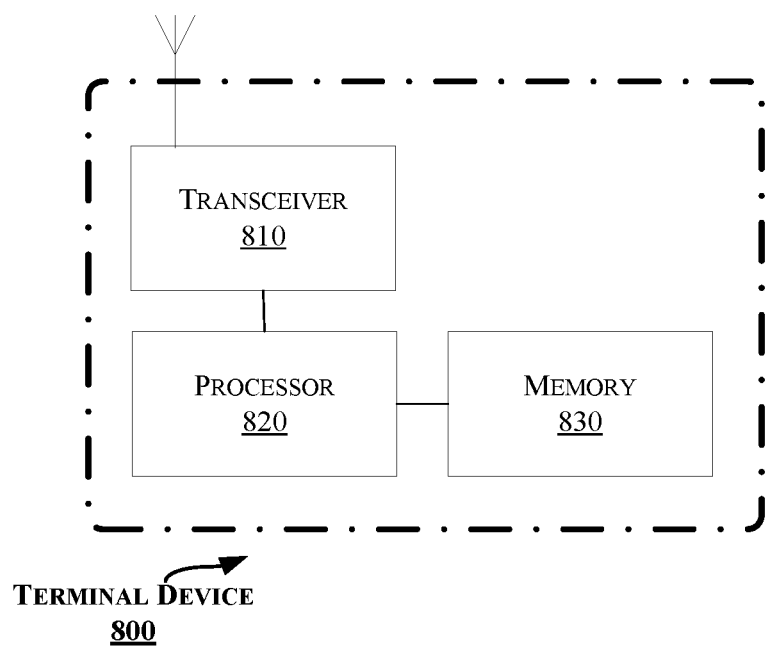
FIG. 8 is a block diagram of a terminal device according to another embodiment of the present disclosure.

FIG. 8 is a block diagram of a terminal device 800 according to another embodiment of the present disclosure.

The terminal device 800 includes a transceiver 810, a processor 820 and a memory 830. The memory 830 contains instructions executable by the processor 820 whereby the terminal device 800 is operative to perform the actions, e.g., of the procedure described earlier in conjunction with FIG. 2. Particularly, the memory 830 contains instructions executable by the processor 820 whereby the terminal device 800 is operative to: receive DCI from a network device; derive a TBS index from information contained in the DCI; and determine, based on the TBS index, a TBS from a set of TBSs including TBSs usable with QPSK and TBSs usable with 16-QAM. When the DCI is for a NPDSCH, the TBSs usable with 16-QAM are determined based on a deployment mode.

In an embodiment, the TBSs usable with 16-QAM may be associated with different ranges of TBS indices depending on whether the terminal device operates in a stand-alone, guard-band, or in-band deployment mode.

In an embodiment, one or more of the TBSs usable with 16-QAM may be inherited from a set of TBSs previously defined for TBSs used with 16-QAM for Physical Downlink Shared Channel (PDSCH) in LTE, for example, in Table 7.1.7.2.1-1 of TS 36.213, V16.0.0.

In an embodiment, the TBSs usable with 16-QAM may be dedicated for 16-QAM when the terminal device operates in a stand-alone or guard-band deployment mode.

In an embodiment, the TBSs usable with 16-QAM may be associated with TBS indices ranging from 14 to 15.

In an embodiment, the TBSs usable with 16-QAM may include TBSs usable with both 16-QAM and QPSK.

In an embodiment, when the terminal device operates in a stand-alone or guard-band deployment mode, the TBSs usable with 16-QAM may further include TBSs dedicated for 16-QAM. The TBSs usable with both 16-QAM and QPSK may be associated with TBS indices ranging from 9 to 13 and the TBSs dedicated for 16-QAM may be associated with TBS indices ranging from 14 to 15.

In an embodiment, when the terminal device operates in an in-band deployment mode, the TBSs usable with both 16-QAM and QPSK may be associated with TBS indices ranging from 9 to 13.

In an embodiment, when the DCI is for a NPUSCH, the 16-QAM is used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

Alternatively, the memory 830 contains instructions executable by the processor 820 whereby the terminal device 800 is operative to perform the actions, e.g., of the procedure described earlier in conjunction with FIG. 4. Particularly, the memory 830 contains instructions executable by the processor 820 whereby the terminal device 800 is operative to: receive DCI from a network device; derive a TBS index from information contained in the DCI; and determine, based on the TBS index, a TBS to be used for NPUSCH from a set of TBSs including TBSs used with QPSK and TBSs usable with 16-QAM.

In an embodiment, the TBSs usable with 16-QAM may be usable with both 16-QAM and QPSK.

In an embodiment, the TBSs usable with 16-QAM may be associated with TBS indices ranging from 10 to 13.

In an embodiment, the DCI may further contain an indication of 16-QAM or QPSK.

In an embodiment, the indication may be included in a new field or an existing field in the DCI.

In an embodiment, the existing field may be a field indicating a number of repetitions for NPUSCH.

In an embodiment, the DCI containing the indication of QPSK and the field indicating a number of repetitions that is equal to a threshold may indicate that no indication of 16-QAM or QPSK is included in the field in next DCI.

In an embodiment, the memory 830 may further contain instructions executable by the processor 820 whereby the terminal device 800 is operative to: receive from the network device an indication of 16-QAM or QPSK via RRC signaling.

In an embodiment, the memory 830 may further contain instructions executable by the processor 820 whereby the terminal device 800 is operative to: determine a modulation scheme for NPUSCH based on the indication of 16-QAM or QPSK.

In an embodiment, the 16-QAM may be used for NPUSCH Format 1 with a full PRB allocation or a multi-tone allocation consisting of 6 or 3 allocated subcarriers.

In an embodiment, the 16-QAM may be used with the multi-tone allocation consisting of 6 or 3 allocated subcarriers in case of coexistence of NPUSCH and NPRACH, or coexistence of the multi-tone allocation and an NPUSCH single tone allocation, within a RPB.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 620 causes the network device 600 to perform the actions, e.g., of the procedure described earlier in conjunction with FIG. 1 or 3; or code/computer readable instructions, which when executed by the processor 820 causes the terminal device 800 to perform the actions, e.g., of the procedure described earlier in conjunction with FIG. 2 or 4.

The computer program product may be configured as a computer program code structured in computer program modules. The computer program modules could essentially perform the actions of the flow illustrated in FIG. 1, 2, 3, or 4.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

Figure 9:
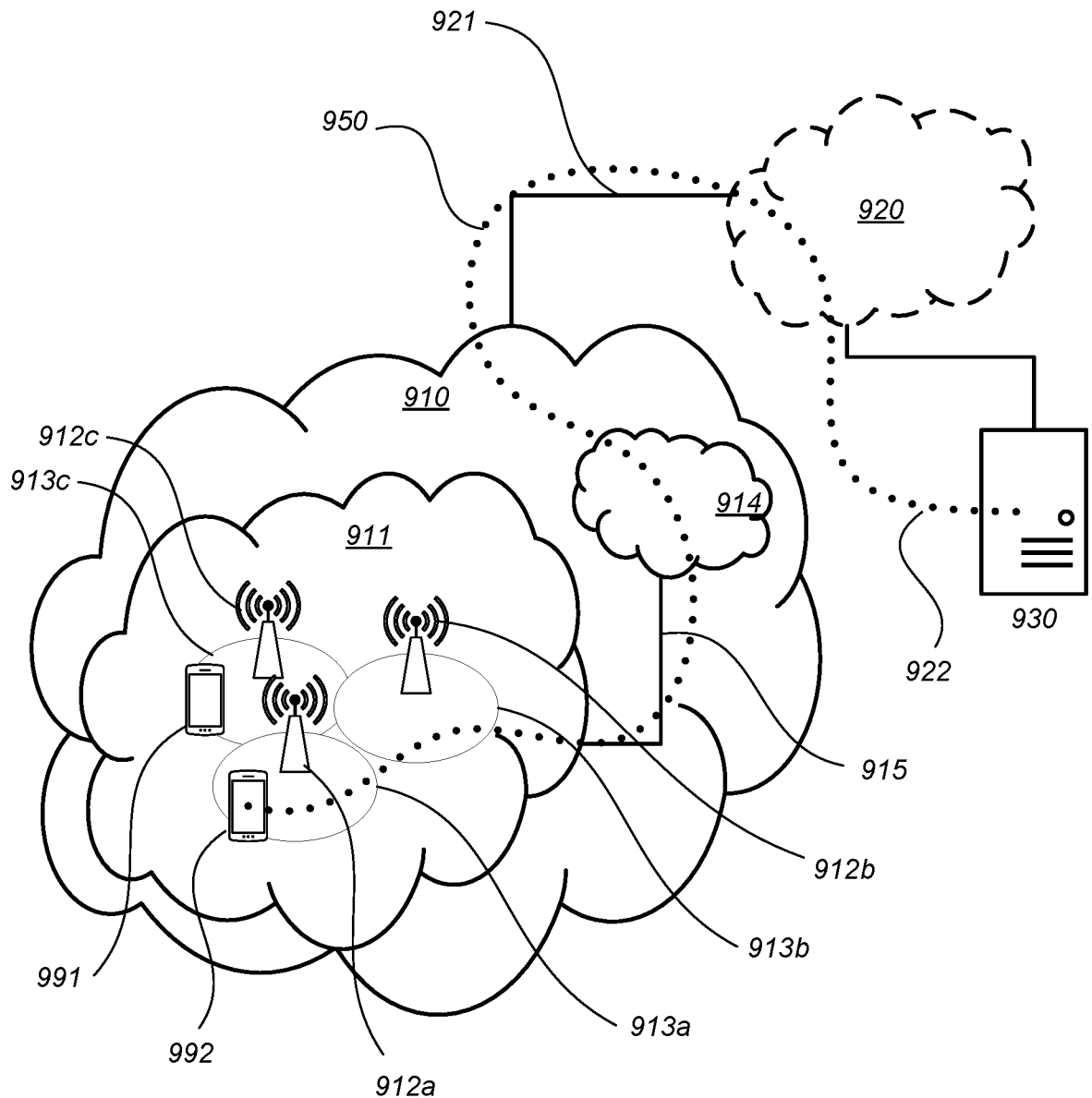
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
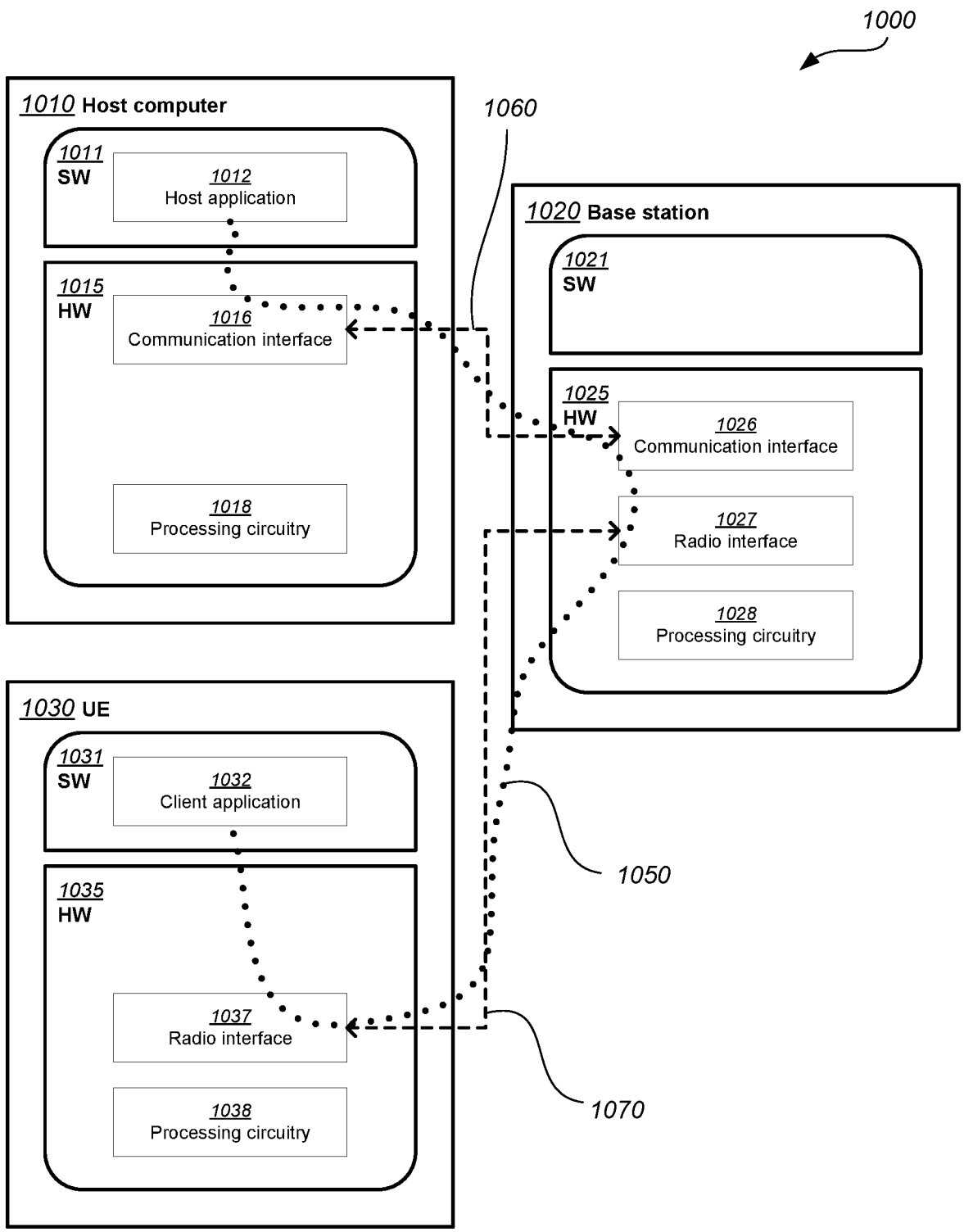
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve resource utilization and data rate, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

Alternatively or additionally to the above, the following may be considered:

There is disclosed a method in a terminal or terminal device (which may in general be a method of operating a terminal). The method may comprise receiving data signaling (e.g., from a network node or network device) based on a transport block size (TBS), the transport block size being indicated by a 16QAM indication indicating use of 16QAM modulation (for the data signaling). There may also be considered a terminal (or terminal device) adapted for, and/or comprising and/or being adapted for utilising processing circuitry and radio circuitry adapted for, receiving data signaling based on a transport block size, the transport block size being indicated by a 16QAM indication indicating use of 16QAM modulation (for the data signaling). Also, a method in a network node or network device (or a method of operating a network node or network device) may be considered. The method may comprise transmitting, to a terminal or terminal device, data signaling using a TBS, the TBS being indicated to the terminal or terminal device by a 16 QAm indication indicating use of 16QAM modulation (for the data signaling). Also, there is described a network node or network device adapted for, and/or comprising and/or being adapted for utilising processing circuitry and radio circuitry adapted for, transmitting, to a terminal or terminal device, data signaling using a TBS, the TBS being indicated to the terminal or terminal device by a 16QAM indication indicating use of 16QAM modulation (for the data signaling).

The data signaling may in general be data signaling using 16-QAM modulation, for example based on the 16QAM indication. Alternatively, or additionally, the TBS may be based on a transport block size indication (TBSI). The 16QAM indication may be separate of the TBSI, for example in the same or a different message or signaling, or in some cases, the TBSI may represent and/or double as and/or function as 16QAM indication as well, for example pointing at a TBS for 16QAM in a table comprising (in particular, separate) TBS entries for 16QAM and at least one other modulation (e.g., QPSK); for example a TBS table having entries index 0 to 8 or 0 to 13 may be used for and/or associated to the other modulation, wherein entries 9 to 13 or 15, or 14 to 15 may be used for and/or associated to 16QAM (as described above, this may be considered an example of implicit indication). In other cases, the 16QAM indication may be included as a separate indicator in a DCI message, indicating for example use of 16QAM for the data signaling. An indication may in general be implicit or explicit. An implicit 16QAM may for example be a pointer or indicator indexing a table comprising transport block sizes (TBS) for different modulations to be used, and/or pointing to a TBS associated to 16QAM from such a table. An explicit 16QAM indication may be represented by a field in a message (e.g., comprising 1 or more bits) indicating that 16QAM is to be used and/or indicating a table with entries associated to 16QAM (e.g., TBS for 16 QAM, in particular the table may comprise entries only for 16QAM), and/or may be a field in a DCI described above, e.g. a new field and/or a reused field. The 16 QAm indication may indicate one out of a set of tables, wherein the set of tables may include one or more tables for 16 QAm and/or one or more tables for one or more other modulations and/or one or more tables for a combination of modulations, e.g. containing entries pertaining to 16QAM and one or more other modulations.

Receiving data signaling based on a 16QAM indication may comprise demodulating and/or decoding the data signaling assuming it is modulated with 16QAM (e.g., associating received symbols with corresponding symbols in modulation space) and/or based on the signaling having the indicated TBS (e.g. associating received bits with data and/or error detection coding and/or forward error correction coding based on the TBS). The TBS may be based on a table as described herein, e.g. indexed by a TBSI. The terminal may be configured and/or have stored (e.g., predefined or configured) one or more tables indicating TBS. Different tables may be associated to different modulations and/or deployment modes. For example, there may be different tables for different deployment modes. A deployment mode may for example be configured to the terminal, e.g. with RRC (Radio Resource Control) layer signaling and/or broadcast signaling, e.g. as part of system information (which in some cases may be considered RRC layer signaling). Examples of deployment modes are stand-alone, guard-band operation or in-band operation. A table may be considered different from another table if it differs at least in one table entry. Transmitting data signaling having 16QAM modulation and/or a TBS may comprise encoding and/or modulating the data signaling accordingly. A network device or network node may be adapted for configuring the terminal with the deployment mode, and/or may configure the terminal with the deployment mode.

Data signaling may for example be (e.g., scheduled and/or transmitted) signaling on a physical shared channel, in particular a downlink channel, for example a PDSCH (Physical Downlink Shared Channel) or NPDSCH.

Processing circuitry may be integrated circuitry, for example comprising one or more processors and/or controllers and/or ASIC (Application Specific Integrated Circuitry) and/or memory, e.g. random access memory and/or read-only memory and/or cache memory. Radio circuitry may comprise integrated circuitry for processing radio signaling (e.g., receiving and/or transmitting), e.g. one or more receivers and/or transmitters and/or transceivers, and/or one or more power amplifiers and/or Analog to Digital Converters and/or Digital to Analog Converters and/or sensing circuitries. Radio circuitry may be associated to processing circuitry, e.g. included therein and/or be controllable by processing circuitry).

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further provides the following example Embodiments.

Embodiment 1. A method (100) in a network device, comprising:
  transmitting (110) Downlink Control Information, DCI, to a terminal device, the DCI containing information from which a Transport Block Size, TBS, index is derivable, wherein the TBS index is usable to determine a TBS to be used for Narrowband Physical Downlink Shared Channel, NPDSCH, from a set of TBSs including TBSs used with Quadrature Phase Shift Keying, QPSK, and TBSs usable with 16-Quadrature Amplitude Modulation, 16-QAM.

Embodiment 2. The method (100) of Embodiment 1, wherein the TBSs usable with 16-QAM are dedicated for 16-QAM.

Embodiment 3. The method (100) of Embodiment 2, wherein the TBSs usable with 16-QAM are associated with TBS indices ranging from 14 to 15.

Embodiment 4. The method (100) of Embodiment 1, wherein the TBSs usable with 16-QAM comprise TBSs usable with both 16-QAM and QPSK.

Embodiment 5. The method (100) of Embodiment 4, wherein when the terminal device is in a stand-alone or guard-band deployment mode, the TBSs usable with 16-QAM further comprise TBSs dedicated for 16-QAM, and wherein the TBSs usable with both 16-QAM and QPSK are associated with TBS indices ranging from 9 to 13 and the TBSs dedicated for 16-QAM are associated with TBS indices ranging from 14 to 15.

Embodiment 6. The method (100) of Embodiment 4, wherein when the terminal device is in an in-band deployment mode, the TBSs usable with both 16-QAM and QPSK are associated with TBS indices ranging from 9 to 10, from 6 to 10, or from 9 to 13.

Embodiment 7. The method (100) of any of Embodiments 4-6, wherein the DCI further contains an indication of 16-QAM or QPSK.

Embodiment 8. The method (100) of Embodiment 7, wherein the indication is included in a new field or an existing field in the DCI.

Embodiment 9. The method (100) of Embodiment 8, wherein the existing field is a field indicating a number of repetitions for NPDSCH.

Embodiment 10. The method (100) of Embodiment 9, wherein the DCI containing the indication of QPSK and the field indicating a number of repetitions that is equal to a threshold indicate that no indication of 16-QAM or QPSK is included in the field in next DCI.

Embodiment 11. The method (100) of any of Embodiments 4-6, further comprising:
transmitting to the terminal device an indication of 16-QAM or QPSK via Radio Resource Control, RRC, signaling.

Embodiment 12. A method (300) in a network device, comprising:
transmitting (310) Downlink Control Information, DCI, to a terminal device, the DCI containing information from which a Transport Block Size, TBS, index is derivable, wherein the TBS index is usable to determine a TBS to be used for Narrowband Physical Uplink Shared Channel, NPUSCH, from a set of TBSs including TBSs used with Quadrature Phase Shift Keying, QPSK, and TBSs usable with 16-Quadrature Amplitude Modulation, 16-QAM.

Embodiment 13. The method (300) of Embodiment 12, wherein the TBSs usable with 16-QAM are usable with both 16-QAM and QPSK.

Embodiment 14. The method (300) of Embodiment 13, wherein the TBSs usable with 16-QAM are associated with TBS indices ranging from 10 to 13.

Embodiment 15. The method (300) of any of Embodiments 12-14, wherein the DCI further contains an indication of 16-QAM or QPSK.

Embodiment 16. The method (300) of Embodiment 15, wherein the indication is included in a new field or an existing field in the DCI.

Embodiment 17. The method (300) of Embodiment 16, wherein the existing field is a field indicating a number of repetitions for NPUSCH.

Embodiment 18. The method (300) of Embodiment 17, wherein the DCI containing the indication of QPSK and the field indicating a number of repetitions that is equal to a threshold indicate that no indication of 16-QAM or QPSK is included in the field in next DCI.

Embodiment 19. The method (300) of any of Embodiments 12-14, further comprising:
transmitting to the terminal device an indication of 16-QAM or QPSK via Radio Resource Control, RRC, signaling.

Embodiment 20. The method (300) of any of Embodiments 12-19, wherein the 16-QAM is used for NPUSCH Format 1 with a full Physical Resource Block, PRB, allocation or a multi-tone allocation consisting of 6 or 3 allocated subcarriers.

Embodiment 21. The method (300) of Embodiment 20, wherein the 16-QAM is used with the multi-tone allocation consisting of 6 or 3 allocated subcarriers in case of coexistence of NPUSCH and Narrowband Physical Random Access Channel, NPRACH, or coexistence of the multi-tone allocation and an NPUSCH single tone allocation, within a RPB.

Embodiment 22. The method (300) of Embodiment 21, further comprising, in case of coexistence of NPUSCH and NPRACH, or coexistence of the multi-tone allocation and the NPUSCH single tone allocation, within the RPB:
allocating a subcarrier within the PRB to another terminal device.

Embodiment 23. A network device (600), comprising a transceiver (610), a processor (620), and a memory (630), the memory (630) comprising instructions executable by the processor (620) whereby the network device (600) is operative to perform the method according to any of Embodiments 1-22.

Embodiment 24. A computer readable storage medium having computer program instructions stored thereon, the computer program instructions, when executed by a processor in a network device, causing the network device to perform the method according to any of Embodiments 1-22.

Embodiment 25. A method (200) in a terminal device, comprising:
receiving (210) Downlink Control Information, DCI, from a network device;
deriving (220) a Transport Block Size, TBS, index from information contained in the DCI; and
determining (230), based on the TBS index, a TBS to be used for Narrowband Physical Downlink Shared Channel, NPDSCH, from a set of TBSs including TBSs used with Quadrature Phase Shift Keying, QPSK, and TBSs usable with 16-Quadrature Amplitude Modulation, 16-QAM.

Embodiment 26. The method (200) of Embodiment 25, wherein the TBSs usable with 16-QAM are dedicated for 16-QAM.

Embodiment 27. The method (200) of Embodiment 26, wherein the TBSs usable with 16-QAM are associated with TBS indices ranging from 14 to 15.

Embodiment 28. The method (200) of Embodiment 25 or 26, further comprising:
determining a modulation scheme for NPDSCH to be 16-QAM when the determined TBS is dedicated for 16-QAM.

Embodiment 29. The method (200) of Embodiment 25, wherein the TBSs usable with 16-QAM comprise TBSs usable with both 16-QAM and QPSK.

Embodiment 30. The method (200) of Embodiment 29, wherein when the terminal device is in a stand-alone or guard-band deployment mode, the TBSs usable with 16-QAM further comprise TBSs dedicated for 16-QAM, and wherein the TBSs usable with both 16-QAM and QPSK are associated with TBS indices ranging from 9 to 13 and the TBSs dedicated for 16-QAM are associated with TBS indices ranging from 14 to 15.

Embodiment 31. The method (200) of Embodiment 29, wherein when the terminal device is in an in-band deployment mode, the TBSs usable with both 16-QAM and QPSK are associated with TBS indices ranging from 9 to 10, from 6 to 10, or from 9 to 13.

Embodiment 32. The method (200) of any of Embodiments 29-31, wherein the DCI further contains an indication of 16-QAM or QPSK.

Embodiment 33. The method (200) of Embodiment 32, wherein the indication is included in a new field or an existing field in the DCI.

Embodiment 34. The method (200) of Embodiment 33, wherein the existing field is a field indicating a number of repetitions for NPDSCH.

Embodiment 35. The method (200) of Embodiment 34, wherein the DCI containing the indication of QPSK and the field indicating a number of repetitions that is equal to a threshold indicate that no indication of 16-QAM or QPSK is included in the field in next DCI.

Embodiment 36. The method (200) of any of Embodiments 29-31, further comprising:
receiving from the network device an indication of 16-QAM or QPSK via Radio Resource Control, RRC, signaling.

Embodiment 37. The method (200) of any of Embodiments 32-36, further comprising:
determining a modulation scheme for NPDSCH based on the indication of 16-QAM or QPSK.

Embodiment 38. A method (400) in a terminal device, comprising:
receiving (410) Downlink Control Information, DCI, from a network device;
deriving (420) a Transport Block Size, TBS, index from information contained in the DCI; and
determining (430), based on the TBS index, a TBS to be used for Narrowband Physical Uplink Shared Channel, NPUSCH, from a set of TBSs including TBSs used with Quadrature Phase Shift Keying, QPSK, and TBSs usable with 16-Quadrature Amplitude Modulation, 16-QAM.

Embodiment 39. The method (400) of Embodiment 38, wherein the TBSs usable with 16-QAM are usable with both 16-QAM and QPSK.

Embodiment 40. The method (400) of Embodiment 39, wherein the TBSs usable with 16-QAM are associated with TBS indices ranging from 10 to 13.

Embodiment 41. The method (400) of any of Embodiments 38-40, wherein the DCI further contains an indication of 16-QAM or QPSK.

Embodiment 42. The method (400) of Embodiment 41, wherein the indication is included in a new field or an existing field in the DCI.

Embodiment 43. The method (400) of Embodiment 42, wherein the existing field is a field indicating a number of repetitions for NPUSCH.

Embodiment 44. The method (400) of Embodiment 43, wherein the DCI containing the indication of QPSK and the field indicating a number of repetitions that is equal to a threshold indicate that no indication of 16-QAM or QPSK is included in the field in next DCI.

Embodiment 45. The method (400) of any of Embodiments 38-40, further comprising:
receiving from the network device an indication of 16-QAM or QPSK via Radio Resource Control, RRC, signaling.

Embodiment 46. The method (400) of any of Embodiments 41-45, further comprising:
determining a modulation scheme for NPUSCH based on the indication of 16-QAM or QPSK.

Embodiment 47. The method (400) of any of Embodiments 38-46, wherein the 16-QAM is used for NPUSCH Format 1 with a full Physical Resource Block, PRB, allocation or a multi-tone allocation consisting of 6 or 3 allocated subcarriers.

Embodiment 48. The method (400) of Embodiment 47, wherein the 16-QAM is used with the multi-tone allocation consisting of 6 or 3 allocated subcarriers in case of coexistence of NPUSCH and Narrowband Physical Random Access Channel, NPRACH, or coexistence of the multi-tone allocation and an NPUSCH single tone allocation, within a RPB.

Embodiment 49. A terminal device (800), comprising a transceiver (810), a processor (820), and a memory (830), the memory (830) comprising instructions executable by the processor (820) whereby the terminal device (800) is operative to perform the method according to any of Embodiments 25-48.

Embodiment 50. A computer readable storage medium having computer program instructions stored thereon, the computer program instructions, when executed by a processor in a terminal device, causing the terminal device to perform the method according to any of Embodiments 25-48.

The invention claimed is:

1. A method performed by a network device for indicating a Transport Block Size, TBS, the method comprising:
transmitting Downlink Control Information, DCI, to a terminal device, the DCI containing information from which a TBS index is derivable, wherein the TBS index is usable to determine a TBS from a set of TBSs including TBSs usable with Quadrature Phase Shift Keying, QPSK, and TBSs usable with 16-Quadrature Amplitude Modulation, 16-QAM, wherein, when the DCI is for a Narrowband Physical Downlink Shared Channel, NPDSCH, the TBSs usable with 16-QAM are determinable by the terminal device based on a deployment mode, and wherein the TBSs usable with 16-QAM are associated with different ranges of TBS indices depending on whether the terminal device operates in a stand-alone, guard-band, or in-band deployment mode.

2. The method of claim 1, wherein one or more of the TBSs usable with 16-QAM are inherited from a set of TBSs in Table 7.1.7.2.1-1 of TS 36.213, V16.0.0.

3. The method of claim 1, wherein the TBSs usable with 16-QAM are dedicated for 16-QAM when the terminal device operates in a stand-alone or guard-band deployment mode.

4. The method of claim 3, wherein the TBSs usable with 16-QAM are associated with TBS indices ranging from 14 to 15.

5. The method of claim 1, wherein the TBSs usable with 16-QAM comprise TBSs usable with both 16-QAM and QPSK.

6. The method of claim 5, wherein when the terminal device operates in a stand-alone or guard-band deployment mode, the TBSs usable with 16-QAM further comprise TBSs dedicated for 16-QAM, and wherein the TBSs usable with both 16-QAM and QPSK are associated with TBS indices ranging from 9 to 13 and the TBSs dedicated for 16-QAM are associated with TBS indices ranging from 14 to 15.

7. The method of claim 5, wherein when the terminal device operates in an in-band deployment mode, the TBSs usable with both 16-QAM and QPSK are associated with TBS indices ranging from 9 to 13.

8. The method of claim 1, wherein when the DCI is for a Narrowband Physical Uplink Shared Channel, NPUSCH, the 16-QAM is used for NPUSCH Format 1 with a full Physical Resource Block, PRB, allocation or a multi-tone allocation consisting of 6 or 3 allocated subcarriers.

9. The method of claim 8, wherein the 16-QAM is used with the multi-tone allocation consisting of 6 or 3 allocated subcarriers in case of coexistence of NPUSCH and Narrowband Physical Random Access Channel, NPRACH, or coexistence of the multi-tone allocation and an NPUSCH single tone allocation, within a RPB.

10. The method of claim 9, further comprising, in case of coexistence of NPUSCH and NPRACH, or coexistence of the multi-tone allocation and the NPUSCH single tone allocation, within the RPB:
allocating a subcarrier within the PRB to another terminal device.

11. A network device, comprising a transceiver, a processor, and a memory, the memory comprising instructions executable by the processor whereby the network device is operative to perform the method according to claim 1.

12. A method performed by a terminal device, comprising:
receiving Downlink Control Information, DCI, from a network device;
deriving a Transport Block Size, TBS, index from information contained in the DCI; and
determining, based on the TBS index, a TBS from a set of TBSs including TBSs usable with Quadrature Phase Shift Keying, QPSK, and TBSs usable with 16-Quadrature Amplitude Modulation, 16-QAM, wherein, when the DCI is for a Narrowband Physical Downlink Shared Channel, NPDSCH, the TBSs usable with 16-QAM are determined based on a deployment mode, and wherein the TBSs usable with 16-QAM are associated with different ranges of TBS indices depending on whether the terminal device operates in a stand-alone, guard-band, or in-band deployment mode.

13. The method of claim 12, wherein one or more of the TBSs usable with 16-QAM are inherited from a set of TBSs in Table 7.1.7.2.1-1 of TS 36.213, V16.0.0.

14. The method of claim 12, wherein the TBSs usable with 16-QAM are dedicated for 16-QAM when the terminal device operates in a stand-alone or guard-band deployment mode.

15. The method of claim 14, wherein the TBSs usable with 16-QAM are associated with TBS indices ranging from 14 to 15.

16. The method of claim 12, wherein the TBSs usable with 16-QAM comprise TBSs usable with both 16-QAM and QPSK.

17. The method of claim 16, wherein when the terminal device operates in a stand-alone or guard-band deployment mode, the TBSs usable with 16-QAM further comprise TBSs dedicated for 16-QAM, and wherein the TBSs usable with both 16-QAM and QPSK are associated with TBS indices ranging from 9 to 13 and the TBSs dedicated for 16-QAM are associated with TBS indices ranging from 14 to 15.

18. The method of claim 16, wherein when the terminal device operates in an in-band deployment mode, the TBSs usable with both 16-QAM and QPSK are associated with TBS indices ranging from 9 to 13.

19. The method of claim 12, wherein when the DCI is for a Narrowband Physical Uplink Shared Channel, NPUSCH, the 16-QAM is used for NPUSCH Format 1 with a full Physical Resource Block, PRB, allocation or a multi-tone allocation consisting of 6 or 3 allocated subcarriers.

20. The method of claim 19, wherein the 16-QAM is used with the multi-tone allocation consisting of 6 or 3 allocated subcarriers in case of coexistence of NPUSCH and Narrowband Physical Random Access Channel, NPRACH, or coexistence of the multi-tone allocation and an NPUSCH single tone allocation, within a RPB.

21. A terminal device, comprising a transceiver, a processor, and a memory, the memory comprising instructions executable by the processor whereby the terminal device is operative to perform the method according to claim 12.

* * * * *